Figure 1:
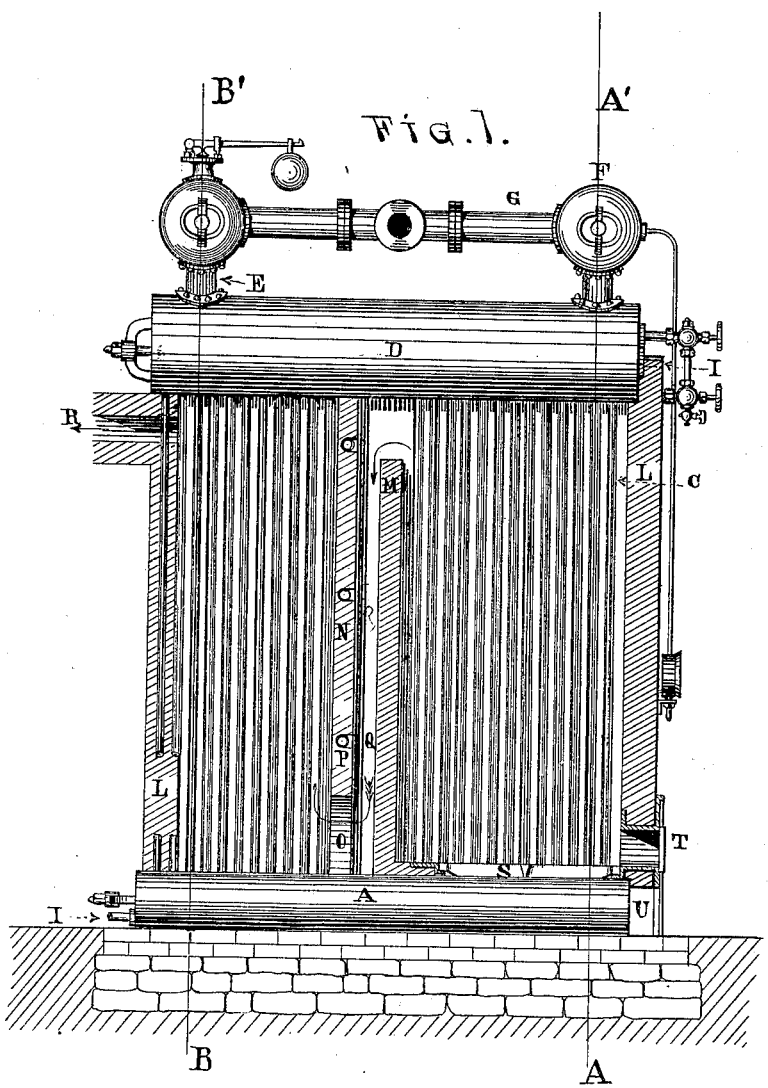

J. & G. FIRMENICH.
Sectional Steam-Generator.

No. 165,222. Patented July 6, 1875.

WITNESSES:
John B. Edmonds
Thomas Edmonds

INVENTORS:
Joseph and George Firmenich
by Michael J. Stark
Attorney

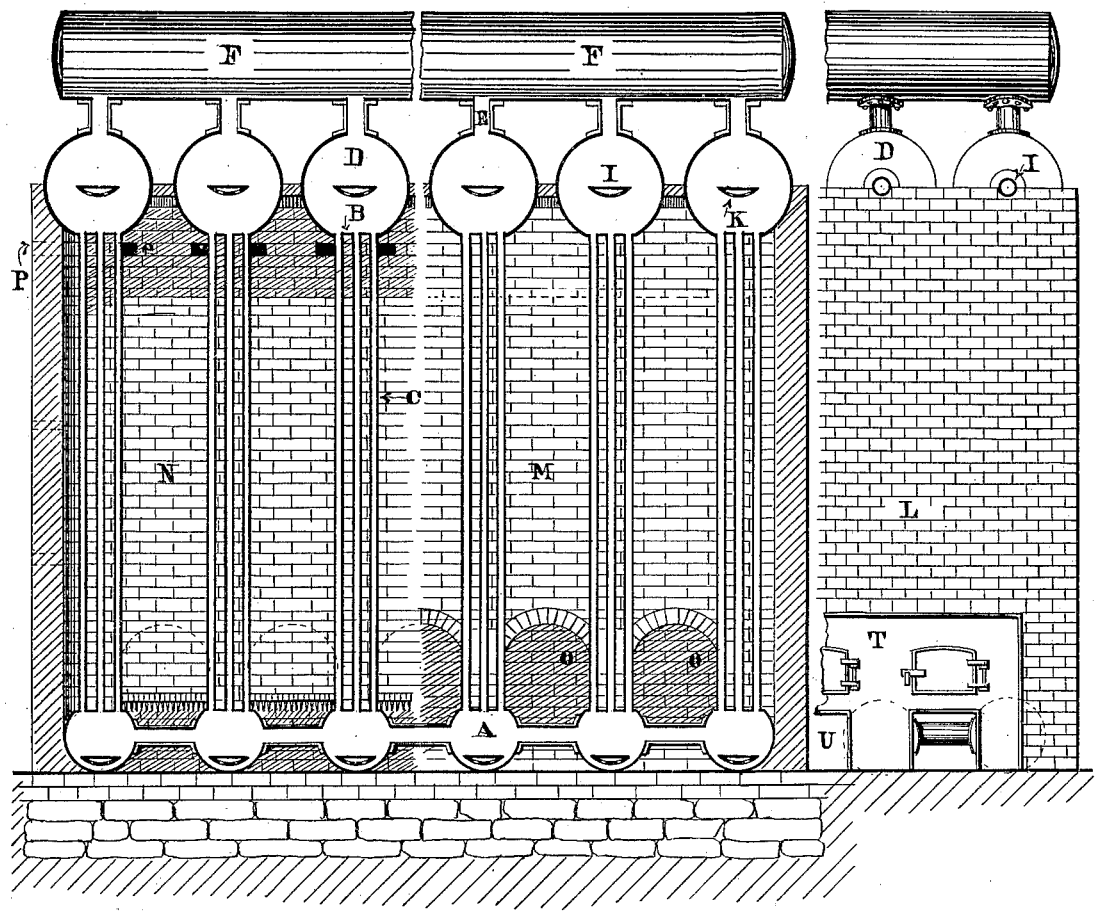

UNITED STATES PATENT OFFICE.

JOSEPH FIRMENICH AND GEORGE FIRMENICH, OF BUFFALO, NEW YORK, ASSIGNORS OF ONE-THIRD THEIR RIGHT TO FRANK FIRMENICH, OF SAME PLACE.

IMPROVEMENT IN STEAM-GENERATORS.

Specification forming part of Letters Patent No. 165,222, dated July 6, 1875; application filed April 15, 1875.

*To all whom it may concern:*

Be it known that we, JOSEPH FIRMENICH and GEORGE FIRMENICH, both of the city of Buffalo, in the county of Erie and State of New York, have invented an Improved Steam-Generator; and we do hereby declare that the following is a full, clear, and exact description of the same, having reference to the accompanying drawings, which make a part of this specification, and in which—

Figure 1 is a longitudinal sectional elevation; Figs. 2 and 3, transverse sections through lines A A' and B B' of Fig. 1, and Fig. 4 a front elevation.

Like letters of reference indicate like parts in the several figures.

This invention relates to the construction and setting of steam-generators; and its nature will be first ascertained, and then pointed out in the claims.

The object of our present invention is the production of a steam-generator in which a better utilization of the products of combustion, and a consequent saving of fuel are obtained than has heretofore been accomplished. It shall also produce a more perfect combustion, and not be liable to deposits of sediments, &c.

In order to enable any one skilled in the art to which our invention pertains to make and use the same, we shall proceed to describe its particulars.

A is a series of mud-drums, constructed of wrought-iron of the usual grade and thickness, rolled and riveted in the usual manner. They are arranged horizontally and parallel with each other in such a manner that there will be a space between each drum sufficient to form a fire-box in conjunction with the heating-flues, as hereinafter described. The transverse section of these mud-drums is that of a circular arc, whose chord B, as it were, serves as a flue-sheet, and is provided with flue-openings of suitable size for the insertion of a series of vertical heating-flues, C, expanded or riveted within the flattened part of the cylindrical mud-drums A. We arrange these flues so that there will be from one to three longitudinal rows in each mud-drum, and terminate them in the middle drum D, constructed and arranged in a manner precisely like the mud-drums A, except that they may be larger in size. Each of these middle drums is connected with the branches E to one or a number of steam-domes, F, from which the supply-pipe G starts. The mud-drums A are also connected with one another by means of branches H, into which the feed-pipe J enters. I are a number of discharge-pipes, having also a transverse section of a circular arc, and provided in their circumference with a number of perforations, K. We place one of such discharge-pipes near the bottom of each of the mud-drums, longitudinally through the entire length of these drums, and provide each of the middle drums with them also, only we place them in about the center of the said drums. These pipes serve as blow-offs, and on account of their small area compared with their size and shape are very effective in operation. The generator is supplied with all the accessories deemed essential in a first-class steam-generator, such as steam and water indicators, gage-cocks, check-valves, safety-valves, &c., and it is set in masonry consisting of the rectangular walls L, incasing the whole apparatus up to the center of the middle drums and the partitions M and N. The front partition M extends to within a convenient distance from the middle drums, while the rear partition traverses the entire space between the mud and the middle drums, and is provided with arched openings O, and also with air-ducts P, having outlets Q. R is the flue connecting the rear chamber with the chimney. S is the fire-grate, situated between two mud-drums, and at a suitable distance from the same, and extending to within a short distance from the front partition-wall. T is the portal, with the usual doors, &c., and U the ash-pit.

The products of combustion pass up in the front chamber, wherein the vertical heating-tubes constitute the walls, and over the front partition-wall down the commingling-chamber V, where they are supplied with a fresh supply of air through the ducts P and outlets Q, and thence through the arched rear partition-wall into the rear chamber and the flue R.

The front partition M, if extended to reach the middle drums D, and provided near its upper end with a number of apertures, of sufficient area to permit the full passage of the products of combustion, and the air-ducts P and outlets Q terminating in these apertures, or right behind the same, would be a substitute for my commingling-chamber. In this case I should discard the rear partition, and arrange the flue R near the bottom of the rear chamber.

The last one or more vertical heating-tubes in each set are embedded in the rear or front wall of the masonry, and, being kept at a considerable lower temperature than the other tubes, serve as circulating-tubes.

We show in the drawings a series of six sets of mud and middle drums, and two transverse steam-receivers, with five fire boxes and grates. This arrangement may be varied as to the number of sets, steam domes, and rows of heating-flues, according to the capacity of steam-generator required, and this arrangement has therefore all the advantages of a sectional steam-generator without many of its drawbacks, such as clogging up from sediments and deposits, and many more.

Having thus fully described our invention, what we desire to secure by Letters Patent is—

1. The arrangement, with the steam and water receptacle D, of the circulating end tubes C, inclosed by the brick wall or walls L, and a mud-drum, A, situated below the fire-line of the steam-generator, substantially as described, and for the use and purpose set forth.

2. The combination, in a steam-generator, as described, of the front, commingling, and rear chambers having the partitions M and N, arranged as shown, and provided with the air-ducts P, and outlets Q, substantially as described, and for the use and purpose set forth.

3. The combination, with the series of mud-drums A and steam and water drums D, of the series of heating-tubes C, and the fire-grate S, when the said fire-grate is arranged between the said series of heating-tubes C and above the mud-drums A, substantially as described, and for the use and purpose set forth.

4. The combination, with the mud-drums A, having the flue-sheet B, of the series of heating-tubes C, steam and water drums D, with the connections E, steam-domes F, with the connections G, and the setting of the steam-generator, consisting of the front and rear walls L and partition M, the whole when arranged substantially as described, and for the use and purpose set forth.

In testimony that we claim the foregoing as our invention we have hereunto set our hands.

J. FIRMENICH.
GEORGE FIRMENICH.

Witnesses:
MICHAEL J. STARK,
JOHN B. EDMONDS.